US009134928B2

(12) United States Patent
Lahey et al.

(10) Patent No.: US 9,134,928 B2
(45) Date of Patent: Sep. 15, 2015

(54) PRINT JOB PROCESSING IN AN AUTOMATED DOCUMENT FACTORY ENVIRONMENT

(75) Inventors: Leonard C. Lahey, Boulder, CO (US); Ned Otey, Louisville, CO (US); Adam A. Swartz, Thornton, CO (US); Brent Winters, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 704 days.

(21) Appl. No.: 13/015,729

(22) Filed: Jan. 28, 2011

(65) Prior Publication Data

US 2012/0194849 A1 Aug. 2, 2012

(51) Int. Cl.
*G06F 3/12* (2006.01)
*G07B 17/00* (2006.01)
*G06Q 10/06* (2012.01)

(52) U.S. Cl.
CPC .............. *G06F 3/1203* (2013.01); *G06F 3/121* (2013.01); *G06F 3/1204* (2013.01); *G06F 3/126* (2013.01); *G06F 3/1259* (2013.01); *G06F 3/1262* (2013.01); *G06F 3/1273* (2013.01); *G06F 3/1274* (2013.01); *G06F 3/1282* (2013.01); *G06F 3/1285* (2013.01); *G06Q 10/06* (2013.01); *G07B 17/00467* (2013.01); *G06F 3/1243* (2013.01); *G06F 3/1264* (2013.01); *G06F 3/1275* (2013.01); *G06F 2206/1514* (2013.01); *G07B 2017/005* (2013.01); *G07B 2017/00483* (2013.01); *G07B 2017/00491* (2013.01)

(58) Field of Classification Search
CPC .................................................... G06F 3/1274
See application file for complete search history.

(56) References Cited

U.S. PATENT DOCUMENTS

| 4,829,468 | A  | * | 5/1989  | Nonaka et al. ............... 358/1.18 |
|-----------|----|---|---------|----------------------------------------|
| 6,557,755 | B1 | * | 5/2003  | Pickering, et al. ............ 235/376 |
| 6,678,067 | B1 | * | 1/2004  | Reda et al. ................... 358/1.14 |
| 6,762,851 | B1 |   | 7/2004  | Lynch et al.                           |
| 7,451,014 | B2 |   | 11/2008 | Welch et al.                           |
| 2004/0008363 | A1 | * | 1/2004  | Suzuki et al. ................ 358/1.14 |
| 2004/0125406 | A1 | * | 7/2004  | McManus et al. ........... 358/1.18 |
| 2005/0031162 | A1 | * | 2/2005  | Sagi et al. ..................... 382/101 |
| 2005/0105129 | A1 | * | 5/2005  | Takahashi .................... 358/1.15 |
| 2007/0236708 | A1 | * | 10/2007 | Jahn et al. ...................... 358/1.6 |
| 2008/0016170 | A1 | * | 1/2008  | MacKelprang et al. ...... 709/206 |

(Continued)

FOREIGN PATENT DOCUMENTS

EP 1952995 A1 6/2008

*Primary Examiner* — King Poon
*Assistant Examiner* — Vincent Peren
(74) *Attorney, Agent, or Firm* — Duft Bornsen & Fettig LLP (57) ABSTRACT

The systems and methods presented herein provide for processing print jobs in an Automated Document Factory (ADF) system. More specifically, these embodiments provide for the selected removal of certain documents after processing of the print job has already initiated (e.g., printing, sorting, inserting, etc.). In one embodiment, a method of processing print jobs through the ADF system includes receiving a print job from a host system via the ADF system. The print job comprises a plurality of documents. The method also includes initiating printing of the documents in the print job, and processing an instruction that identifies at least one document in the print job for removal after initiating printing of the print job. The method also includes removing the at least one document from the print job based on the instruction and processing the remaining documents in the print job through the ADF.

19 Claims, 4 Drawing Sheets

(56) References Cited

U.S. PATENT DOCUMENTS

| | | |
|---|---|---|
| 2008/0077414 A1 | 3/2008 | Ramadei et al. |
| 2008/0091460 A1* | 4/2008 | Paul ................... 705/1 |
| 2008/0143169 A1* | 6/2008 | Mastie et al. ............. 301/5.307 |
| 2008/0267510 A1* | 10/2008 | Paul et al. ................... 382/209 |
| 2008/0291486 A1* | 11/2008 | Isles et al. ................... 358/1.15 |
| 2009/0073500 A1 | 3/2009 | Brown |
| 2009/0244600 A1* | 10/2009 | Haycock et al. ............. 358/1.15 |
| 2010/0027834 A1 | 2/2010 | Spitzig et al. |
| 2010/0106282 A1* | 4/2010 | Mackelprang et al. ....... 700/115 |
| 2011/0231008 A1* | 9/2011 | McIntee ........................ 700/222 |
| 2012/0092702 A1* | 4/2012 | Isidore ........................ 358/1.15 |

* cited by examiner

PRINT JOB PROCESSING IN AN AUTOMATED DOCUMENT FACTORY ENVIRONMENT

FIELD OF THE INVENTION

The invention relates to processing print jobs in an Automated Document Factory (ADF) system.

BACKGROUND

Production printing systems generally comprise a high-speed printer used for volume printing (e.g., capable of printing 100 pages per minute or more). Production printing systems are typically continuous-form printers that print on paper or some other printable medium that is stored on large rolls. Automated Document Factories (ADF's) provide functionality that enhances the performance of production printing systems by providing functional modules that govern the printing process. For example, an ADF may functionally address: input/output constraints; data transformation; delivery preparation of documents; and control/reporting of the production printing system itself. Because of this enhanced functionality, ADF's are preferred for numerous high-volume printing applications including mass-mail printing and newspaper printing.

Typically, a host system produces print jobs to be processed by an ADF for printing. Each host generated print job is a data file that typically contains a plurality of documents to be printed. For example, an organization may generate a print job to print thousands of bills in a single print job. The documents of each print job are often intended for delivery by mail or private carrier. In this regard, the ADF may also provide functionality to control the printing system and other downstream devices (e.g., an inserter) to ensure that the bills are properly printed and mailed to the appropriate people.

The host system transfers the print jobs to the ADF and adds the print jobs to a print queue of the ADF. Once the print jobs of the print queue have printed, it may be desirable for multiple print jobs to be placed together into a shared pool of print jobs to improve efficiency. For example, once a pool of print jobs reaches a certain size, it may be beneficial to sort the documents of the print jobs according to specific sorting criteria. To illustrate, an ADF user may receive a discount on postal processing by pooling multiple print jobs together for later sorting based upon zip code. When the pool is sorted, a higher zip code density is generally achieved for pools of multiple print jobs because there are more documents to sort according to the zip code than in a single print job. Mass mailings with higher zip code densities are preferred by the postal service and therefore receive delivery discounts. Thus, by pooling multiple print jobs for sorting and delivery, costs can be reduced. Examples of sorting categories include "USPS Pre-sort," and "Private Carrier Ground Freight."

Errors may enter print jobs in an ADF from a variety of sources. For example, ADF's may receive print jobs from older "legacy" host systems with outdated printer control/formatting functionality. Thus, these systems may occasionally generate print jobs that have undesirable errors that are sent to the ADF. Additionally, it is not uncommon for simple proofreading errors in any given print job to be detected by a user after a print job has already been sent to the ADF or even immediately before the documents are inserted into an envelope. Such events that create a need for document review are often unpredictable. Because print errors may be detected at very late stages in the printing process, ADF users desire methods to selectively remove documents from pools of print jobs for review and management. Unfortunately, no functionality exists to flag print jobs for review once the ADF has received the print job.

Additionally, users of an ADF may desire to provide special post-processing treatment for specific print jobs. For example, billing statements for high-value customers may be inserted into decorative envelopes instead of plain envelopes. Because customer accounts are not differentiated in incoming print jobs, identifying specific documents of a print job for special handling is a problem when the print job has already been received by the ADF. If a print job is not properly flagged for special post-processing before it is sent to an ADF, it may be improperly treated by an inserter and then re-printed (i.e., after detection of the error), resulting in wasted time and resources.

SUMMARY

Embodiments herein provide for processing print jobs in an Automated Document Factory (ADF) system. More specifically, these embodiments provide for the selected removal of certain documents after processing of the print job has already initiated (e.g., printing, sorting, inserting, etc.). In this regard, a method of processing print jobs through the ADF system includes receiving a print job from a host system via the ADF system. The print job comprises a plurality of documents. The method also includes initiating printing of the documents in the print job, and processing an instruction that identifies at least one document in the print job for removal after generation of the print job. The method also includes removing the document from the print job based on the instruction and processing the remaining documents in the print job through the ADF.

The instruction may include a document name, keywords within the document, the intended recipient of a given document, document size, author name, date the document was created. In this regard, the method may further include identifying a stage of processing of the document and transferring the instruction to the stage of processing of the document to remove the document from that stage of processing (e.g., printing, sorting, or inserting).

The various embodiments disclosed herein may be implemented in a variety of ways as a matter of design choice. For example, the embodiments may take the form of physical machines (e.g., a printer, an inserter, and a sorter), computer hardware, software, firmware, or combinations thereof. In another embodiment, a computer readable medium is operable to store software instructions for processing print jobs in through Automated Document Factory (ADF) system. These software instructions are configured so as to direct the datacenter or some other processing system to operate in the manner described above. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
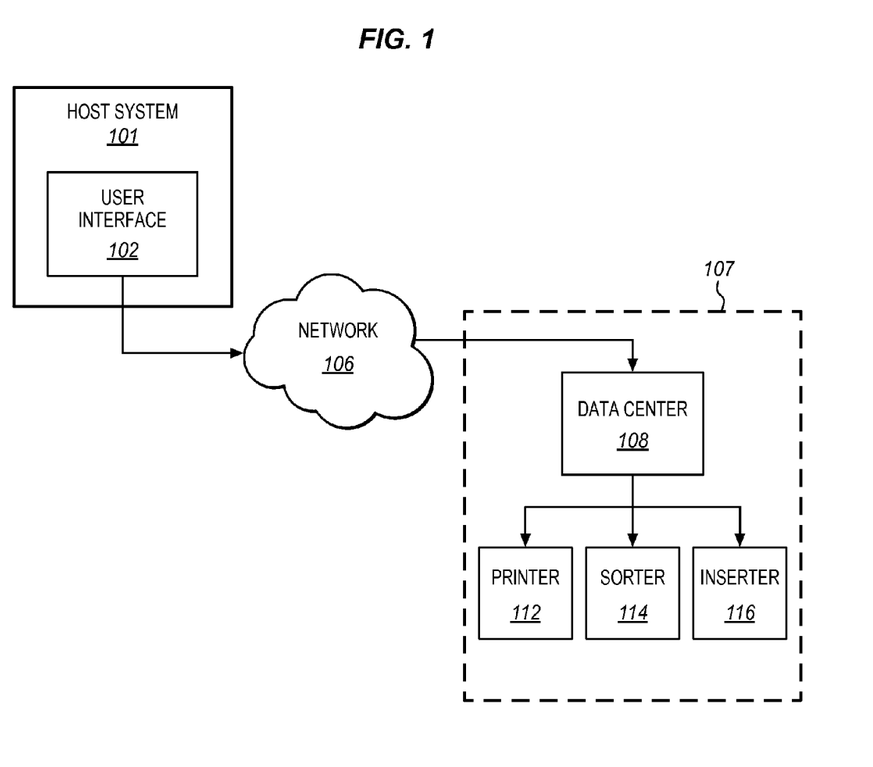
FIG. 1 is a block diagram of an ADF system in an exemplary embodiment.

FIG. 1 is a block diagram of exemplary ADF system 107. ADF system 107 may comprise any combination of production printing systems and control devices operable to process print jobs in an ADF environment (e.g., printing, inserting, and/or sorting documents of the print jobs). In this embodiment, ADF system 107 comprises datacenter 108, printer 112, sorter 114, and inserter 116. ADF system 107 receives the print jobs from host system 101 via network 106. ADF system 107 may also receive instructions for processing those print jobs from host system 101. For example, a user of host system 101 may enter instructions through user interface 102 to provide for special processing of the documents in a particular print job after ADF system 107 initiates processing of that print job.

Host system 101 may be a computer terminal, a computer workstation, a mobile computer, or other computing device. User interface 102 may be provided as a hardware device, software program, or internet application with host system 101. User interface 102 displays/describes a variety of menu options and inputs for management of print jobs in the ADF environment. User interface 102 is operable to receive user input via an input device such as a keyboard, a mouse, or the like, and forward the user input to datacenter 108 via network 106. The user input is provided for selection and alteration of print jobs that are currently being processed by ADF system 107. Network 106 may comprise any functional communication medium for transferring the user input between datacenter 108 and user interface 102 (e.g., a wired network connection, a LAN, wireless LAN, the internet, a local system bus, or the like).

In this embodiment, user input from user interface 102 may include a variety of parameters for identifying documents within a print job. For example, user input may comprise a list of documents, a selection criteria (e.g., keywords within the document, the intended recipient of a given document, etc.) or a document property (e.g., document size, author name, date the document was created, etc.). User input may also include commands for altering or splitting a given print job within ADF system 107.

Although illustrated in this embodiment as being a part of ADF system 107, datacenter 108 may be implemented as an independent functional module or may be functionally integrated into host system 101 or network 106. For example, datacenter 108 could reside on host system 101 as an application. Alternatively, datacenter 108 could be implemented as a processing system within the ADF system 107 alongside the printer 112, sorter 114, and the inserter 116 to manage data processing for the ADF system (e.g., processing of host generated print jobs). Datacenter 108 is operable to receive a print job from host system 101 and initiate processing of the print job within ADF system 107. Print jobs received by datacenter 108 may encompass a variety of print formats, such as Advanced Function Printing (AFP), Portable Document Format (PDF), Page Description Language (PDL's), or others. Print jobs may alternatively comprise computer file formats that are converted before printing can occur. Datacenter 108 processes print jobs by directing printer 112 to print the print jobs, directing sorter 114 to sort the printed documents of the print jobs according to some predefined criteria, and directing inserter 116 to insert the printed documents into envelopes and/or provide additional materials to the printed documents. Datacenter 108 may also process feedback from printer 112, sorter 114, and inserter 116 to provide reporting capabilities to host system 101 regarding the processing by these modules.

Additionally, the ADF environment illustrated in FIG. 1 is merely intended to be exemplary. ADF system 107 may be operable to process print jobs from a plurality host systems that are remotely located or even collocated with the ADF system. For example, ADF system 107 may be operated by a printing company that provides printing services to a plurality of large enterprises (e.g., such that billing expenses may be more easily isolated by those enterprises). Alternatively ADF system 107 may receive relatively large print jobs from a plurality of departments in an organization. Accordingly, the concepts demonstrated herein are not intended to limit the invention to any particular embodiment.

Printer 112 comprises any of a variety of high-volume printers (e.g., for the mass-printing of documents). In this regard, printer 112 is operable to receive and process print jobs from host system 101, each print job comprising a plurality of documents (e.g., bills, customer statements, etc.). Inserter 116 is operable to combine the printed documents with inserts and/or place the printed documents into an envelope for mailing. Sorter 114 is operable to sort documents of the print jobs based upon a particular sorting category. For example, if a print job is flagged as "USPS Pre-Sort," sorter 114 may group the print job with other print jobs that are also flagged as "USPS Pre-Sort." Sorter 114 may be implemented as an independent machine, or may be implemented as a part of inserter 116.

Figure 2:
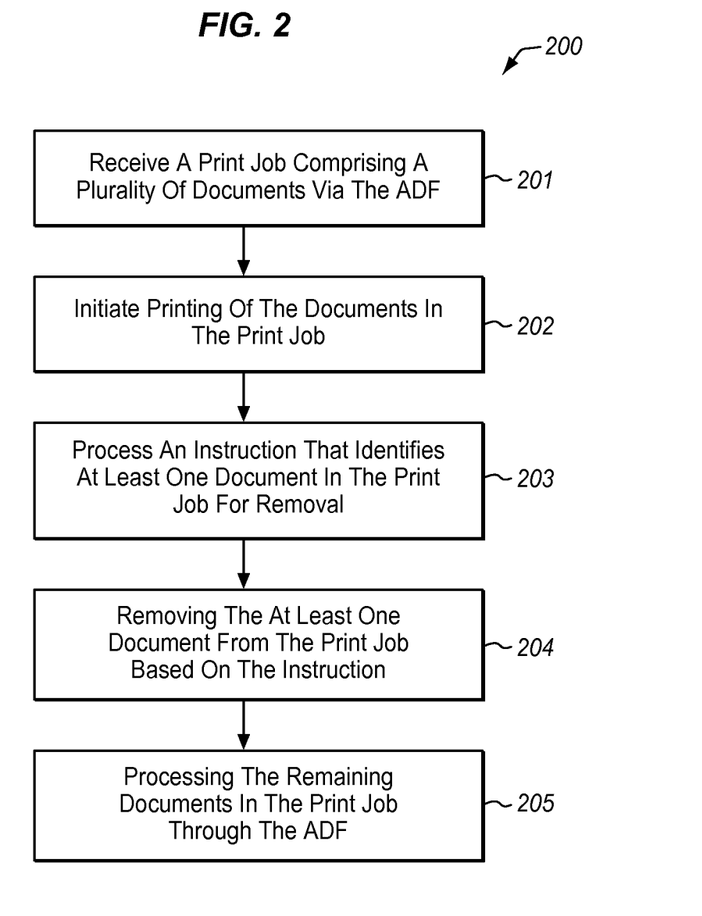
FIG. 2 is a flowchart illustrating an exemplary process for processing print jobs via the ADF system of FIG. 1, in an exemplary embodiment.

FIG. 2 is a flowchart illustrating a process 200 for managing print jobs of an ADF system in an exemplary embodiment. The process 200 is now described with reference to ADF system 107 of FIG. 1. However, those skilled in the art will appreciate that process 200 may be performed in other networks and systems. In this embodiment, host system 101 generates a print job for processing via ADF system 107. Once generated, host system 101 transfers the print job to ADF system 107. As mentioned, the print job is that of a high-volume production printing process and therefore includes a plurality of documents that are to be processed by ADF system 107. In this regard, datacenter 108 receives the print job, in process element 201, and initiates printing of the documents of the print job, in process element 202. For example, datacenter 108 may prepare the print job for printing and then transfer the print job to a print queue of the ADF system 107 such that they may be printed by printer 112. Thereafter, datacenter 108 may receive an instruction from host system 101 to halt processing of one or more documents in the print job. The instruction, when processed by datacenter 108, in process element 203, is operable to identify the documents in the print job for removal from the print job after printing has initiated (i.e., after being received by ADF system 107. For example, a client/user of ADF system 107 may generate an instruction through user interface 102 of the host system 101 that includes information pertaining to a particular document that is to be removed from processing through ADF system 107 (i.e., remove from printing, sorting, inserting, etc.). User interface 102 may transfer this instruction to datacenter 108 such that datacenter 108 may identify and locate the document. The information used to identify the document may include a document name, a selection criteria (e.g., keywords within the document, the intended recipient of a given document, etc.), or a document property (e.g., document size, author name, date the document was created, etc.).

Datacenter 108 may use this information to determine what stage in processing the document is in (i.e., printing, sorting, inserting, etc.). Once the stage in processing is determined, datacenter 108 may transfer an instruction to the particular device in charge of processing the document to remove the document from that processing. For example, if a document is determined to be located in an inserter 116 (i.e., after printing), datacenter 108 may direct inserter 116 to remove the document from the insertion process. Thus, once the document is located generally anywhere in the processing of ADF system 107, datacenter 108 removes or "suppresses" the one or more identified documents in the print job after ADF 107 has initiated processing of the print job, in process element 204. Once removed from the print job, datacenter 108 directs the processing modules of ADF system 107 (i.e., printer 112, sorter 114, and inserter 116) to process the remaining documents of the print job, in process element 205.

An instruction to remove a document from the print job may be received essentially any point in time after datacenter 108 begins processing the print job or even when the print job is being generated. For example, the user of host system 101 may recognize an error within one of the documents of the print job before the print job is to start printing on the printer 112. The user may, at this point, transfer an instruction to datacenter 108 via user interface 102 to terminate printing of that particular document without interrupting the printing of the remaining documents in the print job. In another example, the print job may have completely printed on printer 112 and is ready for sorting via sorter 114 and/or inserting into an envelope via inserter 116. Even after printing has occurred, the user may transfer an instruction to datacenter 108 to remove or "divert" certain documents from the print job. For example, as printed documents are being sorted by sorter 114, datacenter 108 may process the instruction to divert the documents from scheduled processing of the print job such that the diverted documents may be prepared for special handling, manual review, or destruction.

Figure 3:
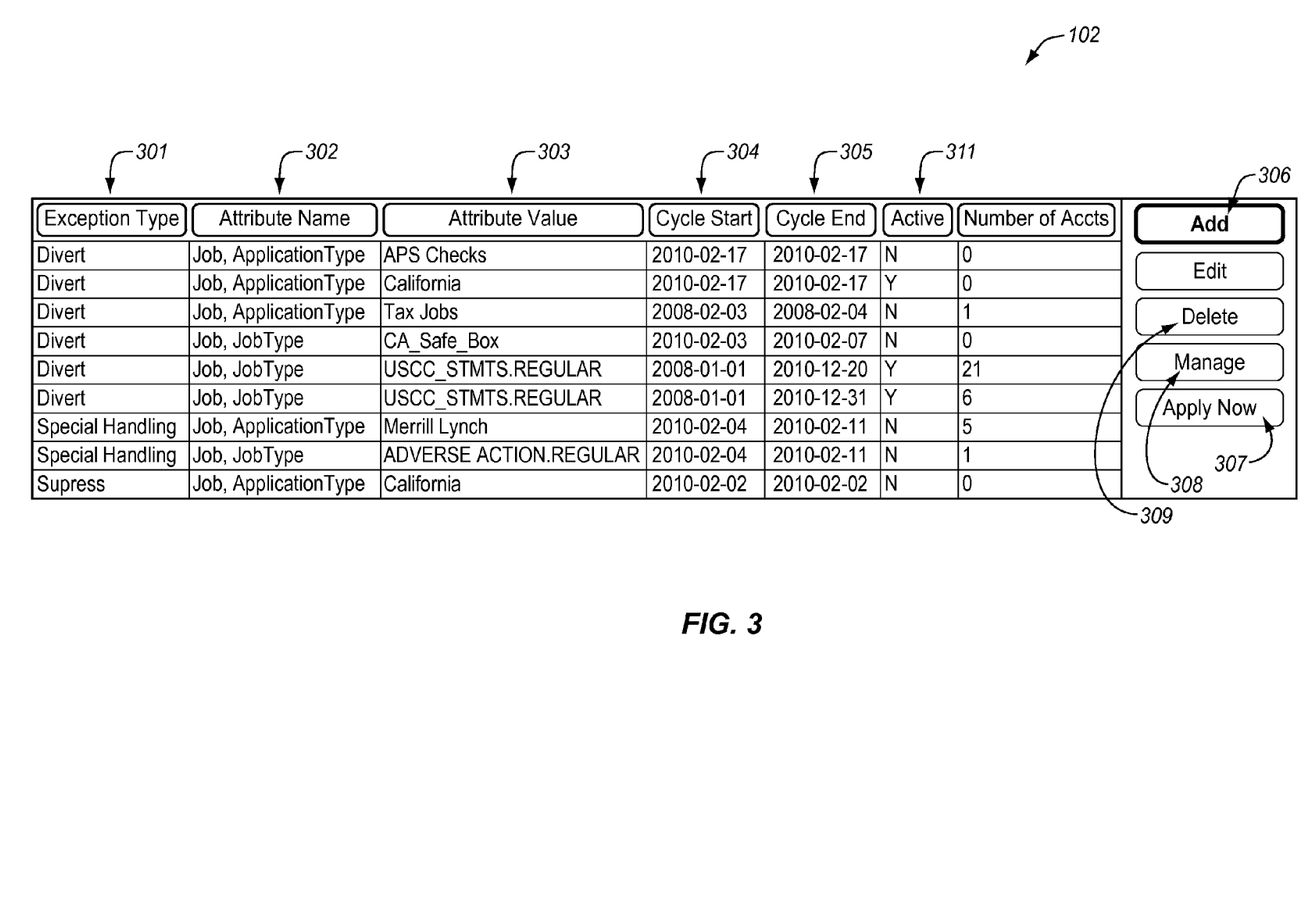
FIG. 3 is a graphical user interface that is operable within a host system to alter processing of certain documents in a print job, in an exemplary embodiment.

FIG. 3 illustrates user interface 102 operable within host system 101 to alter processing of certain documents in a print job by name (e.g., field 303), in an exemplary embodiment. For example, a user through user interface 102 may generate an instruction to remove a particular document from a print job that is currently being processed by ADF system 107. To assist in this regard, user interface 102 may provide information relevant to a document desired for removal that the user may select (e.g., a document name, keywords within the document, the intended recipient of a given document, document size, author name, date the document was created, etc.). The user may then transfer this instruction through user interface 102 to datacenter 108 such that datacenter 108 may locate the document within printer 112, sorter 114, or inserter 116 and remove the document from that processing.

User interface 102 may also provide the user with print job management to define, by print job type (also known as an application type; e.g., field 302) and for a given range of print job cycles (e.g., fields 304 and 305), which documents in the print job should be handled differently (diverted, specially handled, or removed; e.g., field 301). An entry in field 311 may be deemed "active" when all received work matching the print job and print job cycle range contains documents to divert (e.g., suppress or otherwise handle differently). For example, a monthly print job may include multiple bills, statements, etc. When the periodic print job is processed by ADF system 107, the print job is compared to the entry in field 311 to determine whether or not the print job includes a document that is to be regularly diverted (e.g., suppressed). Accordingly, an entry in field 311 that is deemed "inactive" has no documents that are to be regularly diverted.

Additionally, user interface 102 may provide a "Manage" function via button 308, which allows the user to import or define a list of account numbers. Button 307 allows the user to "Apply Now" and run a list against all documents queued in ADF system 107 that require diversion (e.g., individually select documents of a print job for special handling). The "Delete" button 309 allows the user to remove/suppress certain documents from processing via ADF system 107. It should be noted that, when running against all documents in ADF system 107, print jobs may be physically located anywhere in ADF 107 (e.g., printer 112, sorter 114, or inserter 116).

Depending on the location of a particular document in ADF system 107, certain actions may also be recorded. For example, diverts/suppressions may be allowed up until generation of the inserter control file (ICF). The ICF controls how printed documents are inserted into envelopes for mailing (or folded as self enclosing mailers, etc.). However, after the ICF is created, the process may be deemed as a "late divert". Accordingly, a report is generated to divert/suppress documents not originally in the ICF file. An inserter operator may then load this information into inserter 116 and update which files are to be diverted/suppressed.

Figure 4:
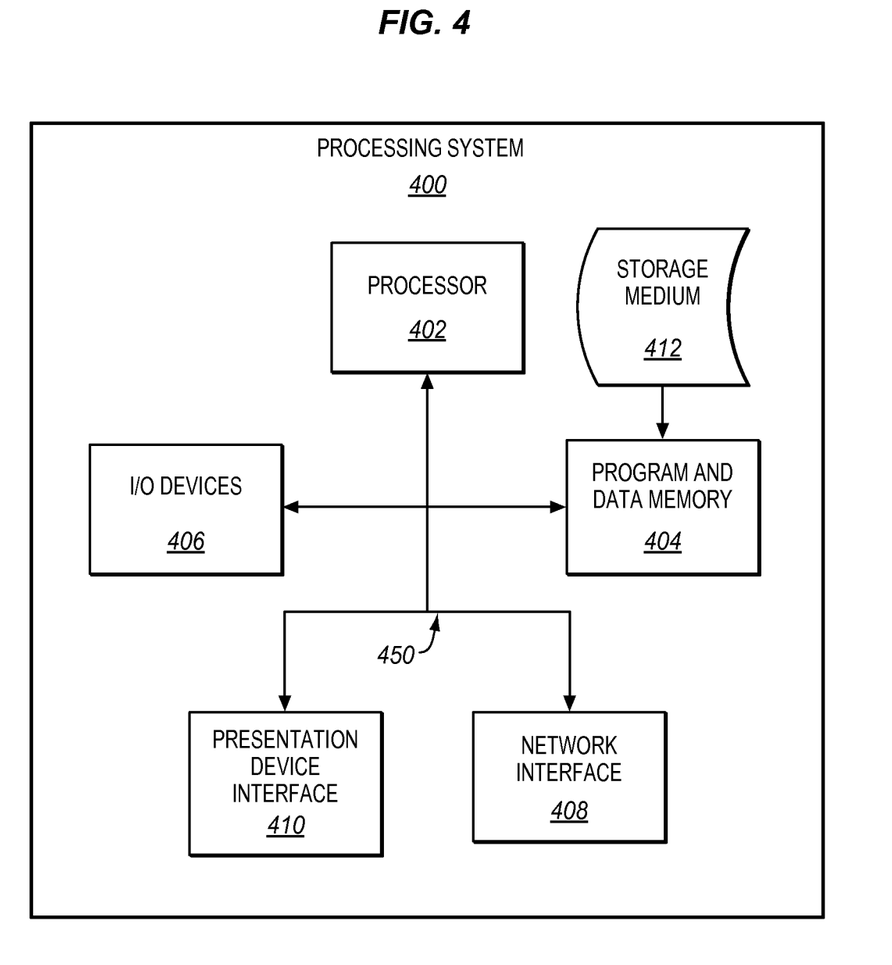
FIG. 4 illustrates an exemplary computer system operable to execute computer readable medium embodying programmed instructions to perform desired functions.

As mentioned, embodiments disclosed herein can take the form of software, hardware, firmware, or various combinations thereof. In one particular embodiment, software is used to direct a processing system of the print controller 140 to perform the various operations disclosed herein. FIG. 4 is a block diagram depicting a processing system 400 also operable to provide the above features by executing programmed instructions and accessing data stored on a computer readable storage medium 412. In this regard, embodiments of the invention can take the form of a computer program accessible via the computer-readable medium 412 providing program code for use by a computer or any other instruction execution system. For the purposes of this description, computer readable storage medium 412 can be anything that can contain, store, communicate, or transport the program for use by the computer.

The computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to memory elements 404 through a system bus 450. Memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although shown and described with respect to automated processing of print job documents, such designations are merely intended to describe the general printing, sorting, and/or inserting of the documents. Accordingly, while specific embodiments are described herein, the scope of the invention is not limited to those specific embodiments. The scope of the invention is defined by the following claims and any equivalents thereof.

We claim:

1. A method of processing print jobs through an Automated Document Factory (ADF) system, the method comprising:
   receiving a print job from a host system via the ADF system, wherein the print job comprises a plurality of documents;
   initiating printing of the documents in the print job;
   altering post-print handling in the ADF system for at least one document in the print job based on a user instruction that is received at the ADF system after the initiating the printing of the documents; and
   generating a report that indicates that the at least one document is to be diverted in the print job in response to a determination that an inserter control file has been generated for the print job, wherein the inserter control file includes insertion instructions for the print job, and wherein the report includes information that enables an inserter to divert the at least one document in the print job after the inserter control file is created for the print job.

2. The method of claim 1, wherein the user instruction includes one or more of the following identifications of the at least one document:
   a document name, a keyword within the at least one document, an intended recipient of a given document, a document size, an author name, a date the at least one document was created.

3. The method of claim 1, further comprising:
   responsive to receiving the user instruction at the ADF system, transferring the user instruction to one of a printing stage, an inserting stage, or a sorting stage in the ADF system based on a determined stage location of the at least one document within the ADF system.

4. The method of claim 1, wherein the altering post-print handling in the ADF system for the at least one document comprises determining that the user instruction includes a command to remove the at least one document from the print job.

5. The method of claim 1, the method further comprising:
   transferring the user instruction to a print stage of processing in response to a determination that the at least one document has not printed; and
   removing the at least one document from the print job without interrupting printing of remaining documents in the print job.

6. The method of claim 1, further comprising:
   physically printing remaining documents in the print job;
   sorting the printed documents; and
   inserting the sorted documents into envelopes for mailing, wherein the printing, sorting, and inserting of the remaining documents in the print job is uninterrupted in the ADF system as a result of the altering.

7. An Automated Document Factory (ADF) system, comprising:
   a datacenter operable to receive a print job from a host system, wherein the print job comprises a plurality of documents, wherein the datacenter is further operable to initiate printing of the documents in the print job, to alter post-print handling in the ADF system for at least one document in the print job based on a user instruction that is received at the datacenter after the initiation of the printing of the documents, and to generate a report that indicates that the at least one document is to be diverted in the print job in response to a determination that an inserter control file has been generated for the print job; wherein the inserter control file includes insertion instructions for the print job, and wherein the report includes information that enables an inserter to divert the at least one document in the print job after the inserter control file is created for the print job.

8. The ADF system of claim 7, wherein the datacenter is further operable to receive the user instruction from a user interface of the host system during printing of the print job by the printer.

9. The ADF system of claim 7, wherein the datacenter is further operable to remove the at least one document from the print job during processing of the print job in the ADF based on a command in the user instruction.

10. The ADF system of claim 7, wherein the datacenter is further operable to remove the at least one document from the print job after printing of the print job based on a command in the user instruction.

11. The ADF system of claim 7, wherein the user instruction includes one or more of the following identifications of the at least one document:
    a document name, a keyword within the at least one document, an intended recipient of a given document, a document size, an author name, a date the at least one document was created.

12. The ADF system of claim 7, wherein the datacenter is further operable to identify a stage of processing of the at least one document and transfer the user instruction to the stage of processing of the at least one document to remove the at least one document from the stage of processing,
    wherein the stage of processing is selected from printing, sorting, or inserting.

13. The ADF system of claim 7, further comprising:
    a sorter operable to sort printed documents; and
    an inserter operable to insert the sorted documents into envelopes for mailing.

14. A non-transitory computer readable medium comprising software instructions that, when executed on a processor, are operable to direct the processor to control processing of print jobs through an Automated Document Factory (ADF) system, the software instructions being further operable to direct the processor to:
- receive a print job from a host system via the ADF system, wherein the print job comprises a plurality of documents;
- initiate printing of the documents in the print job;
- alter post-print handling in the ADF system for at least one document in the print job based on a user instruction that is received at the ADF system after the initiating the printing of the documents; and
- generate a report that indicates that the at least one document is to be diverted in the print job in response to a determination that an inserter control file has been generated for the print job;
- wherein the inserter control file includes insertion instructions for the print job; and
- wherein the report includes information that enables an inserter to divert the at least one document in the print job after the inserter control file is created for the print job.

15. The computer readable medium of claim 14, wherein the user instruction includes one or more of the following identifications of the at least one document:
- a document name, a keyword within the at least one document, an intended recipient of a given document, a document size, an author name, a date the at least one document was created.

16. The computer readable of claim 14, further comprising instructions that direct the processor to:
- identify a stage of processing of the at least one document; and
- transfer the instruction to the stage of processing of the at least one document to remove the at least one document from the stage of processing,
- wherein the stage of processing is selected from printing, sorting, or inserting.

17. The computer readable of claim 14, further comprising instructions that direct the processor to:
- provide a user interface to the host system; and
- receive the user instruction from the user interface via a datacenter of the ADF during physical printing of the print job.

18. The computer readable of claim 14, wherein the the user instruction includes a command to remove the at least one document from the print job, and the instructions that direct the processor are further configured to remove the at least one document during generation of the print job.

19. The computer readable of claim 14, wherein the user instruction includes a command to remove the at least one document from the print job, and the instructions that direct the processor are further configured to remove the at least one document after physical printing of the print job.

* * * * *